Figure 1:
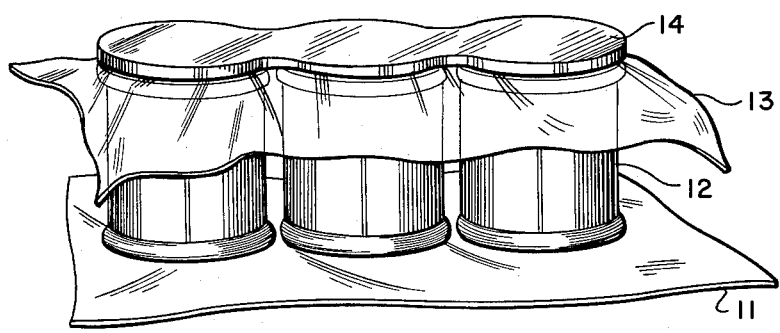

May 19, 1964   J. W. HARRISON   3,133,387
METHOD OF FORMING A MULTIPLE PACKAGE
Filed May 22, 1961

United States Patent Office 3,133,387
Patented May 19, 1964

3,133,387
METHOD OF FORMING A MULTIPLE PACKAGE
John W. Harrison, Winchester, Mass., assignor to W. R. Grace & Co., Cambridge, Mass., a corporation of Connecticut
Filed May 22, 1961, Ser. No. 111,645
6 Claims. (Cl. 53—30)

This invention relates to packaging and more particularly to a novel method of banding together a plurality of tubular containers having beaded or flanged rims using shrinkable thermoplastic film and to the package obtained thereby.

Packaging together a number of discrete units for retail sales has become a relatively common and widespread practice. This banding or packaging together of individual units into a package containing a number of such units is desirable for many reasons. The purchaser frequently desires a plurality of such units and it is more convenient to purchase and store units so packaged. So called multiple packaging is an aid to the retailer in the handling and sale of the items concerned. Banding or multiple packaging is employed when it is desired to tie in the sale of one item with another or to provide a premium or gift to promote the sale of some item. Packaging in this way also lessens the chances of damage to the articles.

However, banding together a number of articles as heretofore practiced has not been completely satisfactory due to the somewhat high costs of banding, which are due in part to the amount of hand labor required, the inadequacy of the available equipment to speed up or eliminate much of the hand operations and to the overall deficiency or unsuitability of the heretofore employed banding materials, such as paper, cardboard, string or wire, rubber bands, adhesive tapes, etc. Where the handling materials pass the test of sturdiness and rigidity in holding the articles together, they fail in one or more essential respects such as aesthetic appeal, economy, practicality and ease of application.

It would be highly desirable if a simple, fast method of tying together a plurality of articles were provided which did not require expensive or complicated equipment, expensive banding materials and which did not require much hand labor. The present invention can be employed to advantage in tying together tubular objects particularly those which have beaded or flanged rims and are of the same or nearly the same height. As employed in this specification, the term "tube" or "tubular container" refers to containers of cylindrical, oval, rectangular or polygonal-shaped cross section. Examples of suitable objects include but are not limited to such items as the common tinplate cylindrical container or can, closed at the top and bottom and having a beaded edge at the top and bottom rims and commonly used to package foods, beverages and other items, rectangular waxed paperboard containers having flanged projections at the top and bottom rims such as those used to package fluids. It is desirable that there be some peripheral projection at the bottom and top rims of the containers such as a beaded or flanged edge, as this permits the shrinking films to more tightly grip the containers.

It is therefore an object of the present invention to provide a novel method for effecting a sturdy and rigid unit package containing a plurality of separate tubular articles.

It is a further object of this invention to provide an economical, easily manufactured multiple unit package using shrinkable, transparent thermoplastic film as a banding material.

It is a still further object of this invention to provide a method of packaging tubular articles on which the final unit package has a protective and attractive covering at both the top and bottom portions thereof, completely shielding said top and bottom portions from dirt and contamination.

Figure 2:
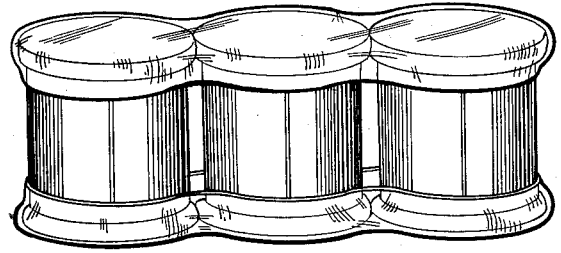

These and further objects and features will become apparent from the following detailed description and accompanying drawings in which:

FIGURE 1 is a perspective view of a preliminary step in the formation of the package of the present invention, and FIGURE 2 is a perspective view showing the completed package.

Various heat shrinkable, thermoplastic films may be used as the banding materials in accordance with my invention. There are presently available films that possess the necessary properties, i.e., high degree of shrink, high shrink energy, clarity and toughness. Examples of suitable film materials include oriented polyethylene, oriented polypropylene, oriented copolymers of vinylidene chloride, oriented polyvinyl chloride, etc. The film employed in the example is a heat shrinkable, irradiated, biaxially oriented polyethylene film, specifically Alathon 14, average molecular weight 20,000, density 0.914, and having a melt index of 1.8. The film is irradiated to an extent of about 12 megarads and subsequently stretched biaxially 350 percent in both a lateral and longitudinal direction. This material has a shrink energy of about 150 pounds per square inch in both directions at 96° C. Shrink energy is the force of contraction at a given temperature when the material is restrained and, more specifically, it is the measurable tension in a fully mono-directionally restrained strip of film when the film is heated to the specified temperature.

The irradiation may be accomplished in a conventional manner, e.g. by the use of electron beam generators such as the 2,000,000 volt General Electric resonant transformer unit, or high energy particle generators of 50,000 to 50,000,000 volts or a Van de Graaff accelerator operating at approximately 2,000,000 volts with a power output of 500 watts. Other radiation sources such as those producing beta or gamma rays may be employed.

Biaxial orientation may be accomplished by any of the methods well known to those skilled in the art and in particular may be accomplished in the manner described in Baird et al. application, Serial No. 713,848, filed February 7, 1958, now Patent No. 3,022,543. The film is oriented by stretching 100 to 900 percent laterally and 100 to 700 percent longitudinally.

In the following examples, the multiple unit package was assembled using three cans, 3⅝ inches in height and having an outside diameter of 2⅛ inches and an irradiated, biaxially oriented polyethylene film strip of about 1.0 mil thickness. It is to be understood, however, that the number and dimensions of the articles to be packaged and the film thickness of the shrinkable thermoplastic banding material are not to be limited to the given example.

A first sheet of film 11, 13 inches by 5 inches is placed on a suitable support and the three cans 12 are placed evenly spaced and upright along the center line of film sheet about one inch apart. A second sheet 13 of approximately the same size as the first sheet of film is placed on top of the cans and means 14 to hold the film on top of the cans is placed over the second sheet of film. Suitable means to hold the second sheet of film in place during the heat shrinking operation include any object of sufficient weight and heat resistance which will cover the top of the objects being packaged together and hold the film during the shrinking operation. In the present example, a metal bar, shaped so as to cover the tops of the three cans, was employed.

The film sheets are sufficiently large so that a margin of more than one inch of the film extends beyond the rims of the cans. Heat from a suitable source, such as hot air from a hot air blower capable of generating a gas temperature of approximately 150° to 600° C. is directed simultaneously against the exposed surfaces of the top and bottom film layers, i.e., those positions of the film sheets not directly shielded from the heat above the top and below the bottom of the respective cans. The individual cans are drawn together by the action of the film as it shrinks along the axis on which the cans are placed. The marginal edges of the film begin to shrink and curl up against and around the side walls of the containers to a height of about one-half inch or more. The shrinking film grips the rims tightly and as the cans slide together there is formed a rigid and compact package in which the three cans are held tightly together by two bands of heavy, i.e., approximately 5 mils thick, film which surround the top and the bottom rims of the cans respectively. The containers packaged according to this invention are provided with a transparent protective covering for the top, bottom and rims of the containers.

It is not necessary that the objects be placed in a single straight line, as has been described above. The objects may be placed in multiple rows or clusters or may be grouped at random on the film sheets. The film when heat shrunk will draw the objects together and band them near the top and bottom rims of the containers as well as covering the top and bottom surfaces of the containers. The objects may be spaced apart or in contact with each other prior to shrinking the film sheets.

Alternatively, it is possible to obtain an even more stable package by spacing the objects more than one inch apart on the film sheet prior to the shrinking operation. As the film shrinks in response to the application of heat, the excess film between the spaced apart objects will be drawn inwardly between the objects as the remaining portions of the film are shrunk. This small flap or ridge of folded film between each of the objects unexpectedly results in a sturdier, more rigid package.

A suitable method for a continuous large scale operation would be to provide an oven, having upper and lower conveyor belts, the belts being sufficiently separated so that the upper conveyor belt would serve as a means for holding the top film layer in place over the articles to be packaged. By providing an extension of the lower conveyor belt on the infeed end, it becomes possible to place the lower sheet of film upon the belt, place the object upon the film and place the upper sheet of film over the objects before reaching the upper conveyor belt. Both conveyor belts pass through a hot air oven where the film sheets shrink quickly about the objects. At the output or delivery end, a further extension of the lower belt conveyor would permit cooling of the film, before packing and shipping. The conveyor belts would preferably be solid belts which are slippery surfaced in order to prevent the adherence of the film to the belts, e.g., silicone coated belts, or belts containing polytetrafluoroethylene.

This invention described in detail in the foregoing specification is susceptible to changes and modifications as may occur to persons skilled in the art without departing from the principle and spirit thereof. The terminology used in the specification is for purposes of description and not of limitation, the scope of the invention being defined in the claims.

I claim:
1. Method of forming a multiple package of tubular containers, each having an outwardly extending projecting edge about its respective top and bottom rim, which comprises:
    (a) placing a first sheet of heat shrinkable, thermoplastic film on a substantially flat support;
    (b) placing a plurality of said tubular containers in upright position upon said first sheet;
    (c) draping a second sheet of heat shrinkable thermoplastic film over the other end of said upright containers and maintaining the portion of said second sheet in contact with said end in fixed relationship to said end;
    (d) substantially simultaneously heating those portions of the two film sheets that are not directly above or below said containers to temperatures sufficient to shrink said portions;
    (e) continuing said heating until the marginal portions of both film sheets have shrunk against the sides of the containers, each sheet tightly gripping the rims of said containers at the end which it covers and drawing the rim of each container into tangential contact with the rim of at least one other container.

2. A method according to claim 1 wherein said containers are placed on the first sheet of heat shrinkable film along a straight line.

3. A method according to claim 1 wherein said containers are cylindrical containers having beaded top and bottom rims.

4. Method of forming a multiple package of tubular containers, each having an outwardly extending projecting edge about its respective top and bottom rim, which comprises:
    (a) placing a first sheet of heat shrinkable, thermoplastic film on a substantially flat support;
    (b) placing a plurality of said tubular containers in upright spaced part position upon said first sheet;
    (c) draping a second sheet of heat shrinkable thermoplastic film over the other end of said upright containers;
    (d) placing a weighted object on the portion of said second sheet in contact with said end so as to maintain a fixed relationship between said portion and said end;
    (e) substantially simultaneously heating the exposed marginal portions of each film sheet to temperatures sufficient to shrink the same;
    (f) continuing said heating until the marginal portions of both film sheets have curled up and lie flat against the sides of the said containers, each sheet tightly gripping the rims of said containers at the end which it covers and drawing the rim of each container into tangential contact with the rim of at least one other container with the excess film between each container providing rigidity to the package.

5. A method according to claim 4 wherein said containers are placed on the first sheet of film along a straight line.

6. A method according to claim 4 wherein said containers are cylindrical containers having beaded top and bottom rims.

References Cited in the file of this patent
UNITED STATES PATENTS

| | | |
|---|---|---|
| 2,554,636 | Pfeiffer | May 26, 1951 |
| 2,668,403 | Rumsey | Feb. 9, 1954 |
| 2,707,553 | Yount | May 3, 1955 |
| 2,885,105 | Heyl et al. | May 5, 1959 |
| 2,980,245 | Stoker | Apr. 18, 1961 |
| 2,996,180 | Bruce | Aug. 15, 1961 |
| 3,014,320 | Harrison | Dec. 26, 1961 |
| 3,024,579 | Stockhausen et al. | Mar. 13, 1962 |
| 3,037,620 | Douty | June 5, 1962 |
| 3,062,373 | Reynolds | Nov. 6, 1962 |
| 2,067,653 | Lesser et al. | Dec. 11, 1962 |

FOREIGN PATENTS

| | | |
|---|---|---|
| 95,116 | Norway | Nov. 23, 1959 |